US011473867B2

(12) United States Patent
Wise

(10) Patent No.: US 11,473,867 B2
(45) Date of Patent: Oct. 18, 2022

(54) TREKKING POLE COUPLING APPARATUS FOR ESTABLISHING A REST

(71) Applicant: Shane Alden Wise, Everson, WA (US)

(72) Inventor: Shane Alden Wise, Everson, WA (US)

( * ) Notice: Subject to any disclaimer, the term of this patent is extended or adjusted under 35 U.S.C. 154(b) by 140 days.

(21) Appl. No.: 16/924,179

(22) Filed: Jul. 9, 2020

(65) Prior Publication Data

US 2021/0010775 A1    Jan. 14, 2021

Related U.S. Application Data

(60) Provisional application No. 62/872,632, filed on Jul. 10, 2019.

(51) Int. Cl.
| | |
|---|---|
| *F16M 11/00* | (2006.01) |
| *F41A 23/10* | (2006.01) |
| *F16M 13/08* | (2006.01) |
| *A45B 3/00* | (2006.01) |

(52) U.S. Cl.
CPC ............... *F41A 23/10* (2013.01); *A45B 3/00* (2013.01); *F16M 13/08* (2013.01)

(58) Field of Classification Search
CPC ............ F41A 23/10; A45B 3/00; F16M 13/08
See application file for complete search history.

(56) References Cited

U.S. PATENT DOCUMENTS

| 5,410,835 | A | * | 5/1995 | Vetter | ............ | F41A 23/06 |
| | | | | | | 42/94 |
| 5,452,872 | A | * | 9/1995 | Barnes | ............ | B05B 15/622 |
| | | | | | | 248/85 |
| 7,823,855 | B2 | * | 11/2010 | Faifer | ............ | F16M 13/00 |
| | | | | | | 248/440.1 |
| 7,946,070 | B1 | * | 5/2011 | Elhart | ............ | F41A 23/16 |
| | | | | | | 42/94 |
| 8,291,633 | B1 | * | 10/2012 | Hass | ............ | F41A 23/10 |
| | | | | | | 42/94 |
| 8,590,440 | B2 | * | 11/2013 | Gallo | ............ | F41A 23/18 |
| | | | | | | 89/37.04 |
| 8,813,407 | B1 | * | 8/2014 | Sargent | ............ | F41A 23/16 |
| | | | | | | 42/94 |
| 8,960,613 | B2 | * | 2/2015 | White | ............ | A63H 23/10 |
| | | | | | | 248/74.1 |
| 10,264,860 | B1 | * | 4/2019 | Rau | ............ | F16M 11/06 |
| 10,648,494 | B1 | * | 5/2020 | Muhammad | ............ | F16B 2/22 |
| 10,856,629 | B1 | * | 12/2020 | Unice | ............ | A45B 1/00 |
| 11,073,238 | B2 | * | 7/2021 | Ballentine | ............ | A45B 5/00 |
| 2008/0095573 | A1 | * | 4/2008 | Hewett | ............ | E04H 15/06 |
| | | | | | | 403/190 |

(Continued)

*Primary Examiner* — Amy J. Sterling
(74) *Attorney, Agent, or Firm* — Rankin, Hill & Clark LLP

(57) ABSTRACT

Trekking pole coupling device to develop a support for an object against a surface; consisting of two couplings, male and female, each comprising a clamp which may be tensioned against a trekking pole. The male coupling comprising lugs, and the female coupling comprising a socket and lips where the male coupling may be inserted and rotated to removably attach both couplings together. The female coupling also comprising multiple stop sockets were stops may be removably attached to limit the rotation of the male coupling within the female coupling. The device also comprising a track where a fixture may be removably attached to the device enabling an object to be removably attached to the device, via the fixture, for further support.

15 Claims, 5 Drawing Sheets

(56) References Cited

U.S. PATENT DOCUMENTS

2016/0135554 A1\* 5/2016 Green ................ A63C 11/00
 135/66
2018/0058794 A1\* 3/2018 Scalf ................ F41A 23/10
2020/0337424 A1\* 10/2020 Friederich ............ F16M 13/08

\* cited by examiner

TREKKING POLE COUPLING APPARATUS FOR ESTABLISHING A REST

CROSS-REFERENCE TO RELATED APPLICATIONS

The present application claims priority under 35 U.S.C. 119(e) to U.S. Patent Application No. 62/872,632, entitled, "Trekking Pole Coupling Apparatus for Establishing a Rest", and filed Jul. 10, 2019.

The following, related and appropriate, U.S. Patent documents have been included for cross-reference:

| | | |
|---|---|---|
| US 20,180,187,830 A1 | May 2018 | Gearing et. al. |
| U.S. Pat. No. 10,352,645 B1 | July 2019 | Antell |
| U.S. Pat. No. 7,905,667 B2 | January 2011 | Barker |
| U.S. Pat. No. 5,311,693 A | May 1994 | Underwood |
| U.S. Pat. No. 5,406,732 A | April 1995 | Peterson |
| USD 390,301 S | February 1998 | Peterson |
| U.S. Pat. No. 5,930,932 A | August 1999 | Peterson |
| U.S. Pat. No. 6,663,071 B2 | December 2003 | Peterson |
| U.S. Pat. No. 6,505,429 B2 | January 2003 | Percival |
| USD 473,280 S1 | April 2003 | Briggs |
| U.S. Pat. No. 6,889,465 B1 | May 2005 | Holmes |
| U.S. Pat. No. 7,946,070 B1 | May 2011 | Elhart |
| US 20,080,095,573 A1 | April 2008 | Hewett et. al. |

STATEMENT REGARDING FEDERALLY SPONSORED RESEARCH OR DEVELOPMENT

Not Applicable to this application.

BACKGROUND OF THE INVENTION

The present invention relates generally to the shooting and outdoor sports industry.

Trekking poles (including, but not limited to: staffs, walking sticks, poles and canes) aid in the act of walking and hiking (trekking) while shooting sticks and tripods aid in providing a stable rest for shooting, viewing, photographing, and filming. In conventional systems trekking poles are designed to aid in trekking only, and shooting sticks and tripods are designed to aid in developing a rest only.

Certain devices have been developed that seek to combine the utility of trekking poles, shooting sticks and tripods into one system. Many of these devices require the users to invest in new systems that do not make use of existing trekking poles and make a compromise between both trekking poles and shooting sticks or tripods for the acts of trekking, shooting, viewing, photographing, and filming. Other systems make use of existing trekking poles, but are very limited in their use and design and do not offer the user adjustability or adaptability to suite the situation.

The Inventor recognized a new system designed to utilize available trekking poles with the ability to adjust and adapt the system to fit the user's situation could provide an advantage to the user by way of minimizing the equipment required to invest in and carry during use.

BRIEF SUMMARY OF THE INVENTION

The present invention comprises a novel method for coupling two trekking poles together by way of two couplings, male and female, in a manner that is quick to implement, sturdy, adjustable and adaptable to suite the situation while providing sufficient support to be used as a rest for an object(s) (including, but not limited to: firearms, spotting scopes, binoculars, monoculars, rangefinders, mobile weather meters, and cameras).

The present invention comprises a method for removably attaching an object to the trekking pole(s) by way of a fixture and a track around the circumference of one the couplings.

The present invention comprises a method for removably attaching one or more stops that limit the rotation of the removably attached couplings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an" and "the" are intended to include the plural forms as well as the singular forms, unless the context clearly indicates otherwise.

Figure 1:
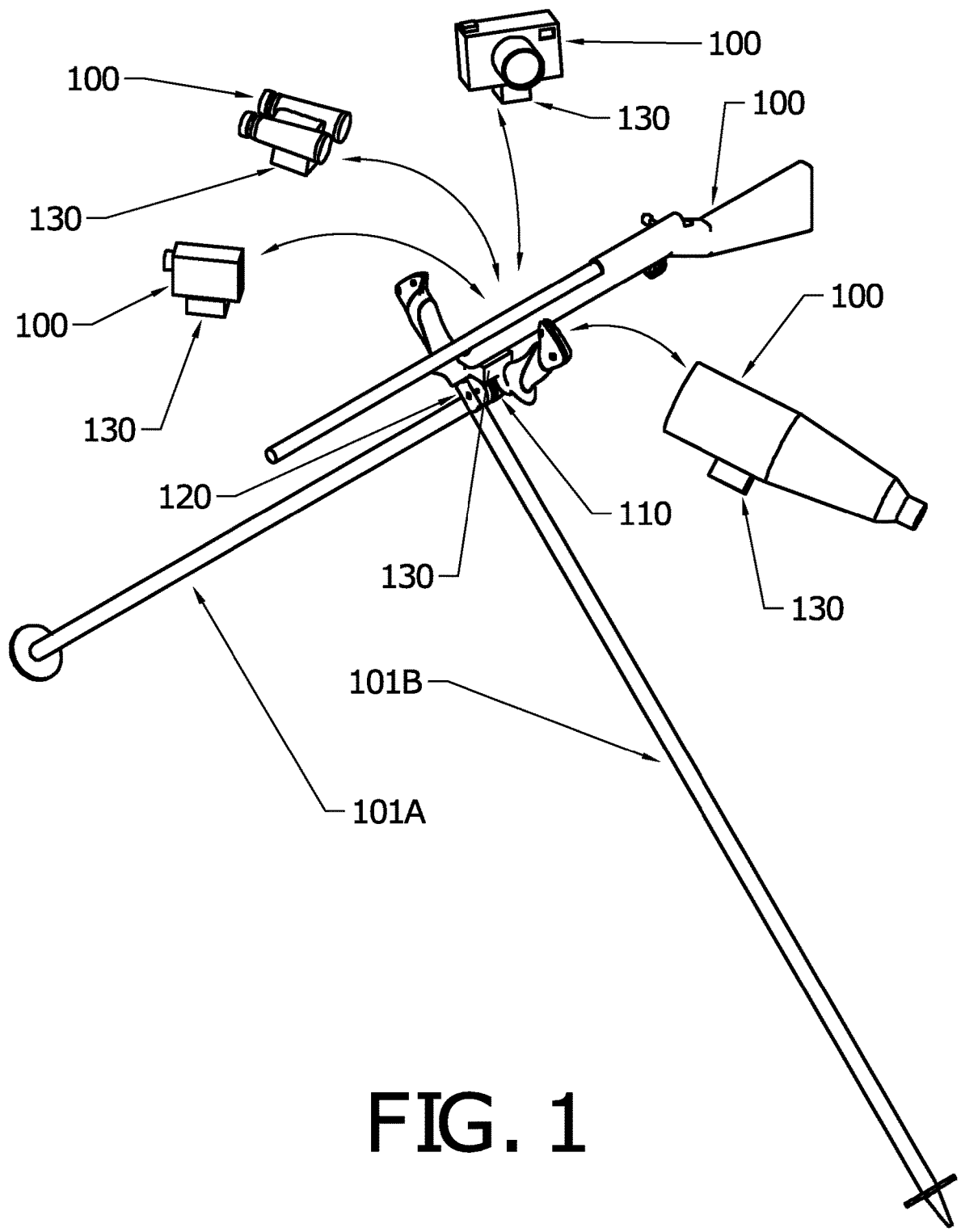
FIG. 1 illustrates a perspective view of one embodiment of a complete system including the object(s), the trekking poles, the coupling device and the fixture according to various embodiments described herein.

FIG. 1 illustrates a complete system view of elements that may comprise a trekking pole coupling device (the "device") according to various embodiments of the present invention. In this embodiment, the device is comprised of two couplings, a male coupling 110 and a female coupling 120 which may be removably attached together. The male coupling 110 and female coupling 120 may each be attached to a trekking pole 101A-B each by way of a clamp 104A-B. The male coupling 110 and female coupling 120 when removably attached together and attached, each, to a trekking pole 101A and 101B may cause the trekking poles 101A-B to cross each other at an angle equal to, less than or greater than a right angle and facilitate the support of an object 100 when rested at or above the intersection of the trekking poles 101A-B. The male coupling 110 and the female coupling 120 cooperate to define a rotation axis 140.

In this embodiment, a fixture 130 may be attached to an object 100 allowing the object 100 to be removably attached, by way of the fixture 130, to the female coupling 120. In another embodiment the fixture may attach to the male coupling 110 or both the male coupling 110 and female coupling 120 either independently or concurrently.

In this embodiment, the male coupling 110 and female coupling 120 are constructed by way of subtractive manufacturing practices from a monolithic copolymer. In other embodiments the coupling male 110 and female 120 may be constructed from, in part or whole, metals, alloys, composites or other natural or synthetic materials by way of additive or subtractive techniques or any combination of.

Figure 2:
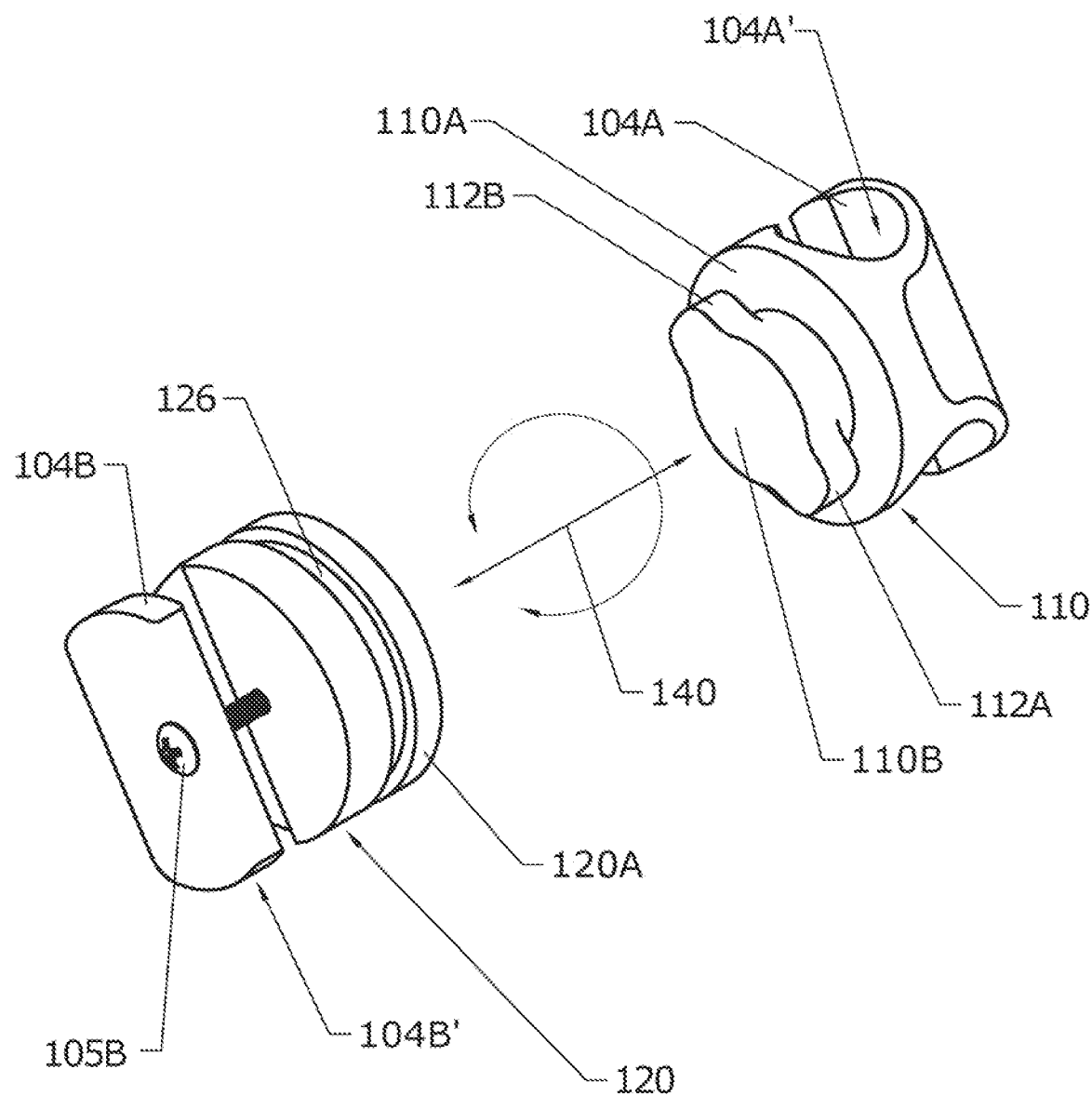
FIG. 2 illustrates a perspective view of a preferred embodiment of a trekking pole coupling device in an unattached state according to various embodiments described herein.

FIG. 2 illustrates the device male coupling 110 and female coupling 120 unattached. In this embodiment, the male coupling 110 may be removably attached to a trekking pole 101A via a clamp 104A. In this embodiment, the clamp 104A is a flexure that may be forcibly tensioned against the trekking pole 101A via a tensioner 105A removably attached to the male coupling 110. The male coupling 110 includes a first body 110A from which the clamp 104A and a protrusion 110B extend. The clamp 104A defines a first channel 104A' for receipt of the first trekking pole 101A. The female coupling 120 includes a second body 120A from which a clamp 104B extends. The clamp 104B defines a second channel 104B' for receipt of the second trekking pole 101B.

In this embodiment, the tensioner 105A is comprised of a threaded bolt which penetrates the body 110A of the male coupling 110 to apply pressure to the clamp 104A. In another embodiment, a cam action lever, magnetic keeper, hook, buckle or other tensioning device may be used to tension the clamp 104A against the trekking pole 101A.

In this embodiment the male coupling 110 includes a plurality of lugs 112A-B which may insert and rotate into the female coupling 120 enabling the male coupling 110 and female coupling 120 to be removably attached together.

In this embodiment, the clamp 104A is positioned on the male coupling 110 in such a way that the axis of the clamp 104A is offset from the perpendicular axis of the lugs 112A-B.

Figure 3:
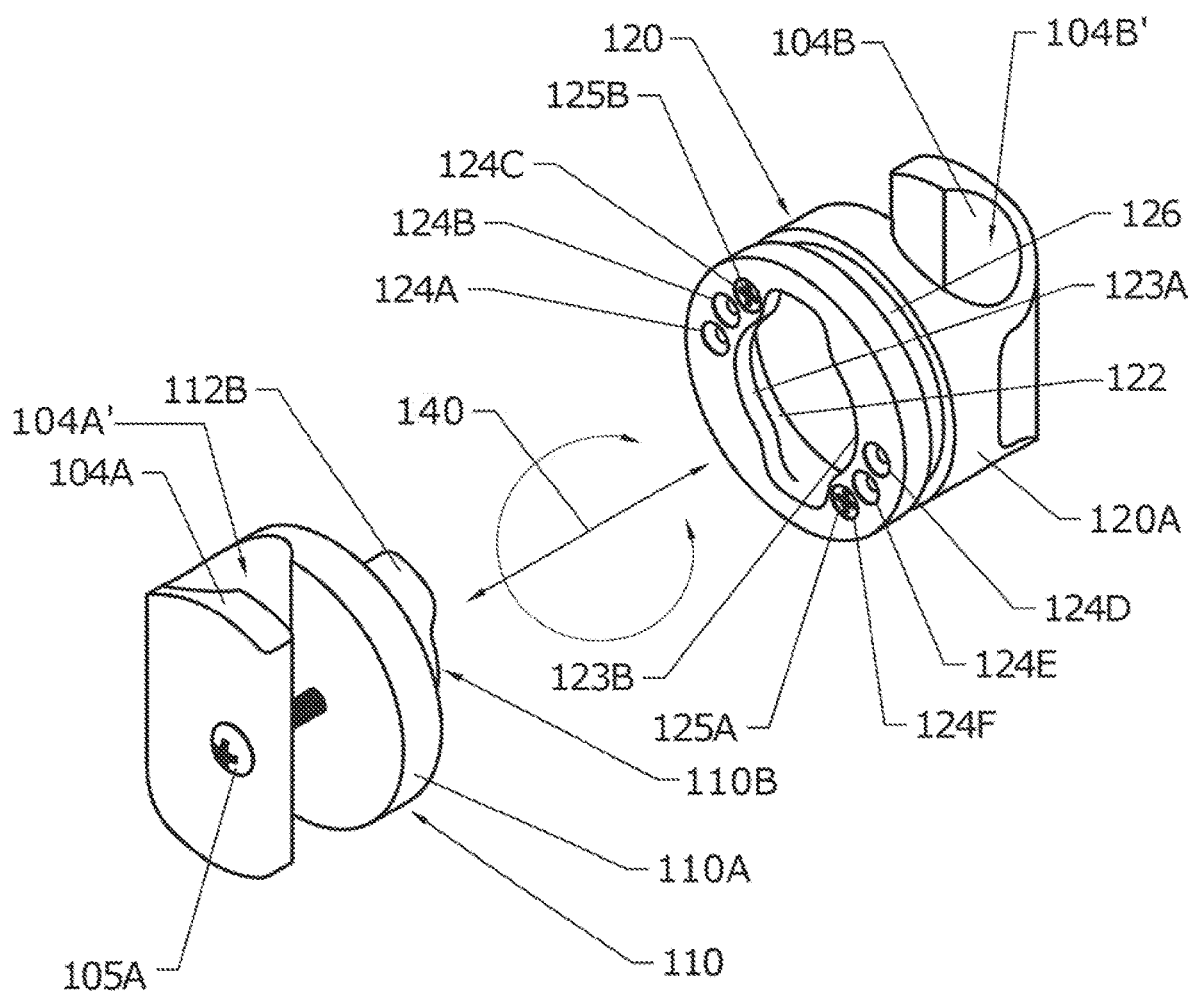
FIG. 3 illustrates another perspective view of a preferred embodiment of a trekking pole coupling device in an unattached state according to various embodiments described herein.
Figure 4:
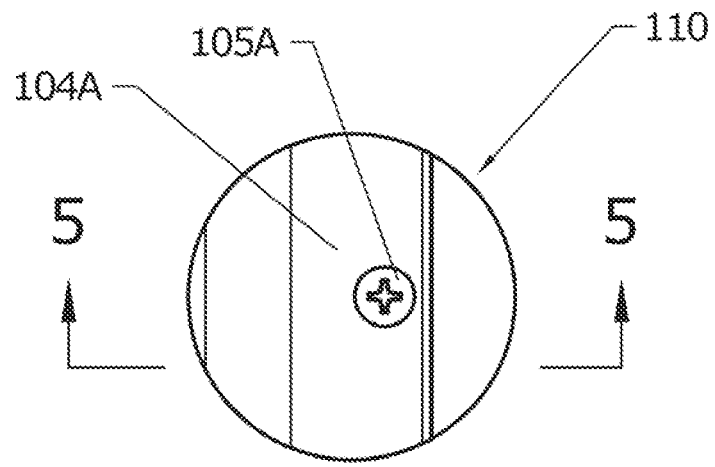
FIG. 4 illustrates an elevation view of a preferred embodiment of a trekking pole coupling device in a removably attached state according to various embodiments described herein.

FIG. 3 illustrates the female coupling 120 and male coupling 110 unattached. In this embodiment, the female coupling 120 may be removably attached to a trekking pole 101B via a clamp 104B. In this embodiment, the clamp 104B is a flexure that may be forcibly tensioned against the trekking pole 101B via a tensioner 105B removably attached to the female coupling 120.

In this embodiment, the tensioner 105B is comprised of a threaded bolt which penetrates the body 120A of the female coupling 120 to apply pressure to the clamp 104B. In another embodiment, a cam action lever, magnetic keeper, hook, buckle or other tensioning device may be used to tension the clamp 104B against the trekking pole 101B.

In this embodiment, the female coupling 120 comprises a socket 122 which comprises a plurality of lips 123A-B where the male coupling 110 lugs 112A-B may be inserted into the socket 122 and rotated under the lips 123A-B to removably attach the male coupling 110 and female coupling 120 together.

In this embodiment, the lips 123A-B are unobstructed on each end, allowing the male coupling 110 lugs 112A-B to rotate indefinitely in either clockwise or counterclockwise directions within the socket 122. In another embodiment, the lips 123A-B may be closed at either end to limit the rotation of the lugs 112A-B in either, or both, the clockwise or counterclockwise rotations.

In this embodiment, the clamp 104B is positioned on the female coupling 120 in such a way that the axis of the clamp 104B is offset from the perpendicular axis of the socket 122.

In this embodiment, the female coupling 120 comprises a plurality of stop sockets 124A-F and stops 125A-B. In this embodiment, the stop sockets 124A-F comprise a threaded hole which may accept a threaded stop(s) 125A-B which may be removably attached to the female coupling 120 to prevent the male coupling 110 from rotating beyond desire by way of the lugs 112A-B contacting the stop(s) 125A-B.

In this embodiment, the lug stop(s) 125A-B are constructed from threaded bolts, but in another embodiment may comprise, a pin, a magnet, a wedge or other removably attached mechanical stop.

In this embodiment, the female coupling 120 comprises a track 126. In this embodiment the track 126 encircles the entire circumference of the female coupling 120, but in another embodiment, may encircle only a portion of the circumference or perimeter of the either male coupling 110, the female coupling 120 or both the male coupling 110 and female coupling 120.

Figure 5:
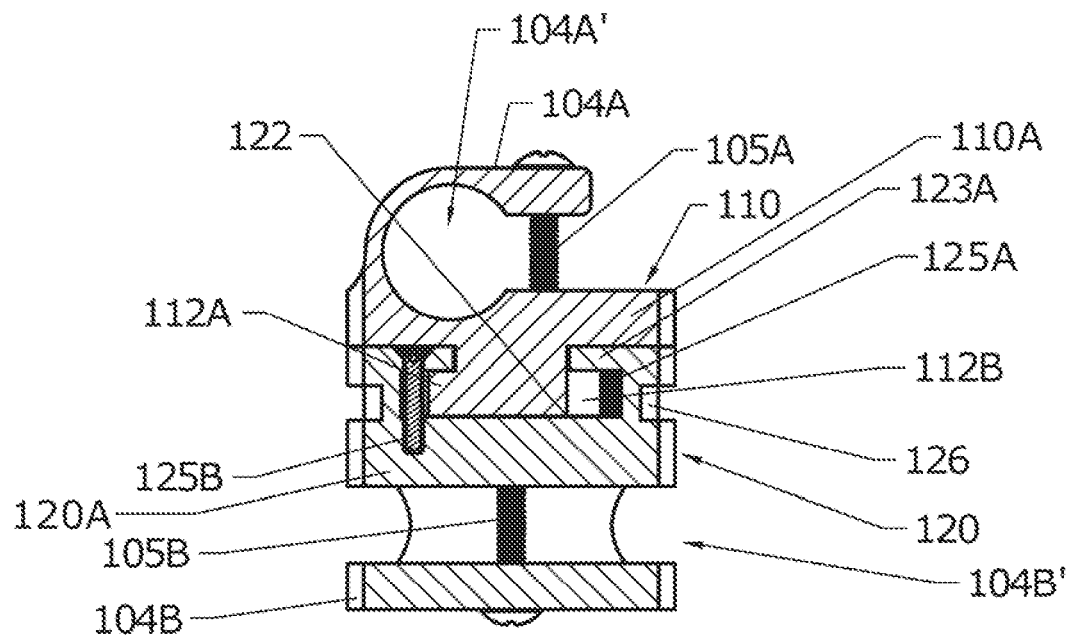
FIG. 5 illustrates a sectional view of a preferred embodiment of a trekking pole coupling device in a removably attached state according to various embodiments described herein.

FIG. 5 illustrates a sectional view of the device where the male coupling 110 and female coupling 120 are removably attached together. In this embodiment, the female coupling 120 socket 122 and lips 123A-B are constructed in a manner which allows the male coupling 110 lugs 112A-B to be inserted into the socket 122 and rotated clockwise or counter-clockwise inside the socket 122 and under the lips 123A-B providing an interference fit and enabling the male coupling 110 and female coupling 120 to be removably attached together. In another embodiment, the female coupling 120 socket 122 and male coupling 110 lugs 112A-B may be constructed in a manner allowing for only one direction of rotation of the male coupling 110 lugs 112A-B under the female coupling 120 lips 123A-B.

Figure 6:
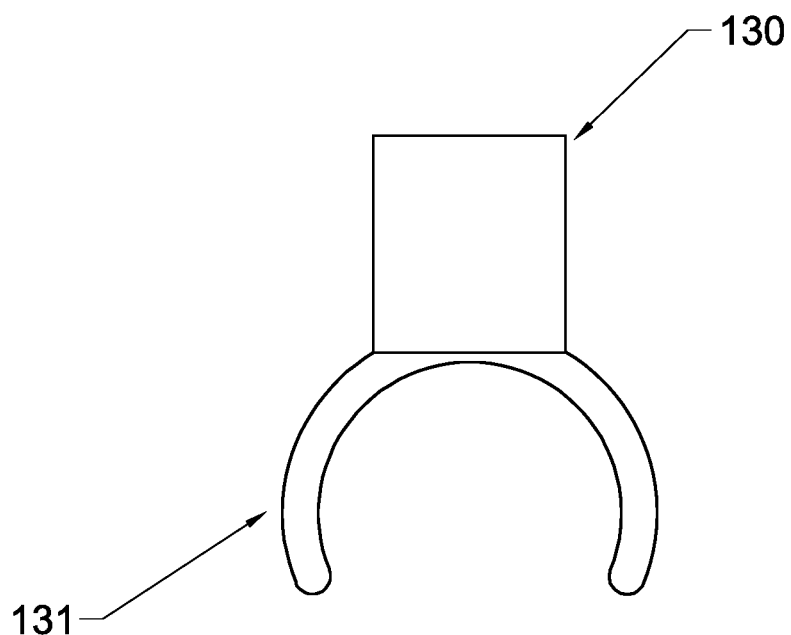
FIG. 6 illustrates an elevation view of a preferred embodiment of a trekking pole coupling device fixture according to various embodiments described herein.

FIG. 6 illustrates one embodiment of a trekking pole coupling device fixture 130. In this embodiments, the fixture 130 may be removably attached to an object 100 and comprises a clip 131 designed to fit within the female coupling 120 track 126. In this embodiment, the clip 131 is constructed to provide a firm interference fit inside the track 126. In another embodiment, the fixture 130 may be permanently affixed to the either male coupling 110 or female coupling 120, or may include a pin or a bolt to attach the fixture 130 to the either or both male coupling 110 or female coupling 120.

The Fixture 130 may be integrally attached to the object 100 or may be removably attached to the object 100.

What is claimed is:

1. A trekking pole coupling apparatus, comprising:
   a male coupling including a first clamp configured to removably attach the male coupling to a first trekking pole and a first body from which the first clamp and a protrusion extend, wherein the male coupling also includes a pair of lugs radially extending from the protrusion in a direction orthogonal to a rotation axis;
   a female coupling including a second clamp configured to removably attach the female coupling to a second trekking pole, the female coupling further includes a plurality of lips, the male coupling and the female coupling cooperating to define the rotation axis, wherein the female coupling selectively prevents removal of the male coupling from the female coupling along the rotation axis: and
   at least one stop, wherein the plurality of lips define a plurality of stop sockets that selectively receive the at least one stop so as to engage the pair of lugs to prevent rotation between the male coupling and the female coupling beyond a predetermined angle.

2. The trekking pole coupling apparatus of claim 1, where male coupling includes a first body from which the first cl , the first clamp defining a first channel for receipt of the first trekking pole and the female coupling includes a second body from which the second clamp extends, the second clamp defining a second channel for receipt of the second trekking pole.

3. The trekking pole coupling apparatus of claim 2, wherein the second body of the female coupling defines a socket that receives the protrusion of the male coupling so as to allow at least partial rotation between the female coupling and the male coupling.

4. The trekking pole coupling apparatus of claim 3, wherein the socket of the second body of the female coupling selectively retains the protrusion of the male coupling.

5. The trekking pole coupling apparatus of claim 3, wherein the pair of lugs are spaced from the first body to allow insertion of the protrusion of the male coupling into the socket of the female coupling.

6. The trekking pole coupling apparatus of claim 3, wherein the plurality of lips selectively engage the pair of lugs to at least partially retain the protrusion within the socket.

7. The trekking pole coupling apparatus of claim 1, wherein the male coupling and the female coupling are configured to be attached to the first trekking pole and the second trekking pole, respectively, at a distance that is spaced from a terminal end of the first trekking pole and a terminal end of the second trekking pole, respectively.

8. The trekking pole coupling apparatus of claim 1, wherein the male coupling and the female coupling cooperate to orient the first trekking pole and the second trekking pole so as to define an upper V-portion to receive an object and a lower inverted V-portion that provides stability to the object.

9. The trekking pole coupling apparatus of claim 1, wherein the female coupling defines a track that circumferentially extends around at least a partial perimeter of the female coupling, the track being configured to receive a clip for attaching an object to the female coupling.

10. The trekking pole coupling apparatus of claim 9, wherein the object is at least one of a firearm, a spotting scope, a pair of binoculars, a monocular, a rangefinder, a mobile weather meter, and a camera.

11. A trekking pole coupling apparatus, comprising:
a male coupling including a first clamp configured to removably attach the male coupling to a first trekking pole, wherein the male coupling includes a first body from which the first clamp and a protrusion extend, the first clamp defining a first channel for receipt of the first trekking pole, wherein the male coupling also includes a pair of lugs radially extending from the protrusion in a direction orthogonal to a rotation axis;
a female coupling including a second clamp configured to removably attach the female coupling to a second trekking pole, the male coupling and the female coupling cooperating to define the rotation axis, wherein the female coupling includes a second body from which the second clamp extends, the second clamp defining a second channel for receipt of the second trekking pole, wherein the second body of the female coupling defines a socket that receives the protrusion of the male coupling so as to allow at least partial rotation between the female coupling and the male coupling, wherein the female coupling selectively prevents removal of the male coupling from the female coupling along the rotation axis, and wherein the female coupling further includes a plurality of lips that selectively engage the pair of lugs to at least partially retain the protrusion within the socket; and
at least one stop, wherein the plurality of lips define a plurality of stop sockets that selectively receive the at least one stop so as to engage the pair of lugs to prevent rotation between the male coupling and the female coupling beyond a predetermined angle.

12. The trekking pole coupling apparatus of claim 11, wherein the male coupling and the female coupling are configured to be attached to the first trekking pole and the second trekking pole, respectively, at a distance that is spaced from a terminal end of the first trekking pole and a terminal end of the second trekking pole, respectively.

13. The trekking pole coupling apparatus of claim 11, wherein the male coupling and the female coupling cooperate to orient the first trekking pole and the second trekking pole so as to define an upper V-portion to receive an object and a lower inverted V-portion that provides stability to the object.

14. The trekking pole coupling apparatus of claim 11, wherein the female coupling defines a track that circumferentially extends around at least a partial perimeter of the female coupling, the track being configured to receive a clip for attaching an object to the female coupling.

15. The trekking pole coupling apparatus of claim 14, wherein the object is at least one of a firearm, a spotting scope, a pair of binoculars, a monocular, a rangefinder, a mobile weather meter, and a camera.

* * * * *